M8806 OR RE 2,1 2
3 Screw making, Head Nicking & Shaving.
2 Sheets—Sheet 1.
T. J. SLOAN.
Machine for Shaving and Nicking Screws.
No. 2,182. Reissued March 6, 1866.
Fig. 2
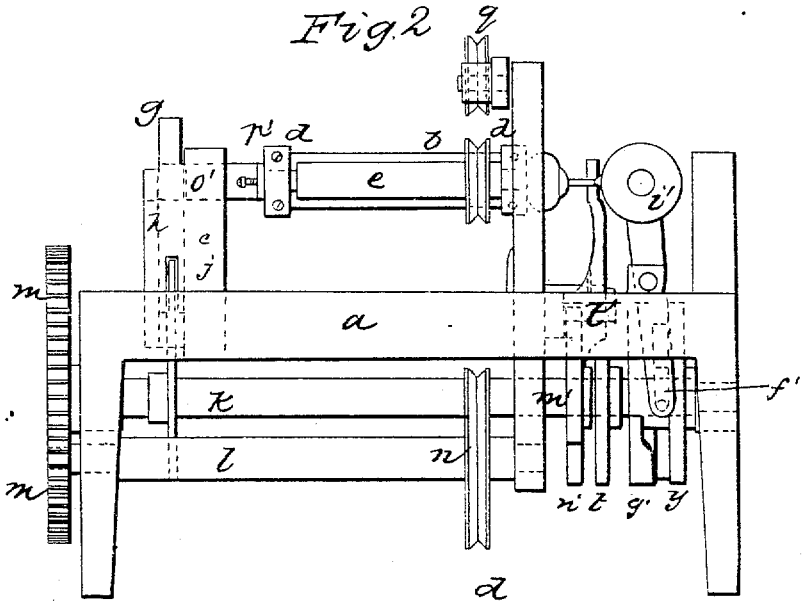
Fig. 1
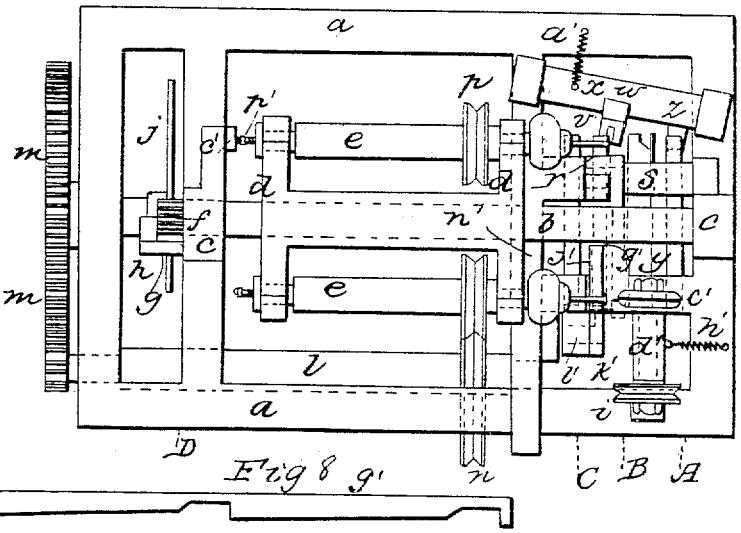
Fig 8
PETERS, Photo-Lithographer, Washington, D. C.

2 Sheets—Sheet 2.
T. J. SLOAN.
Machine for Shaving and Nicking Screws.
No. 2,182. Reissued March 6, 1866.
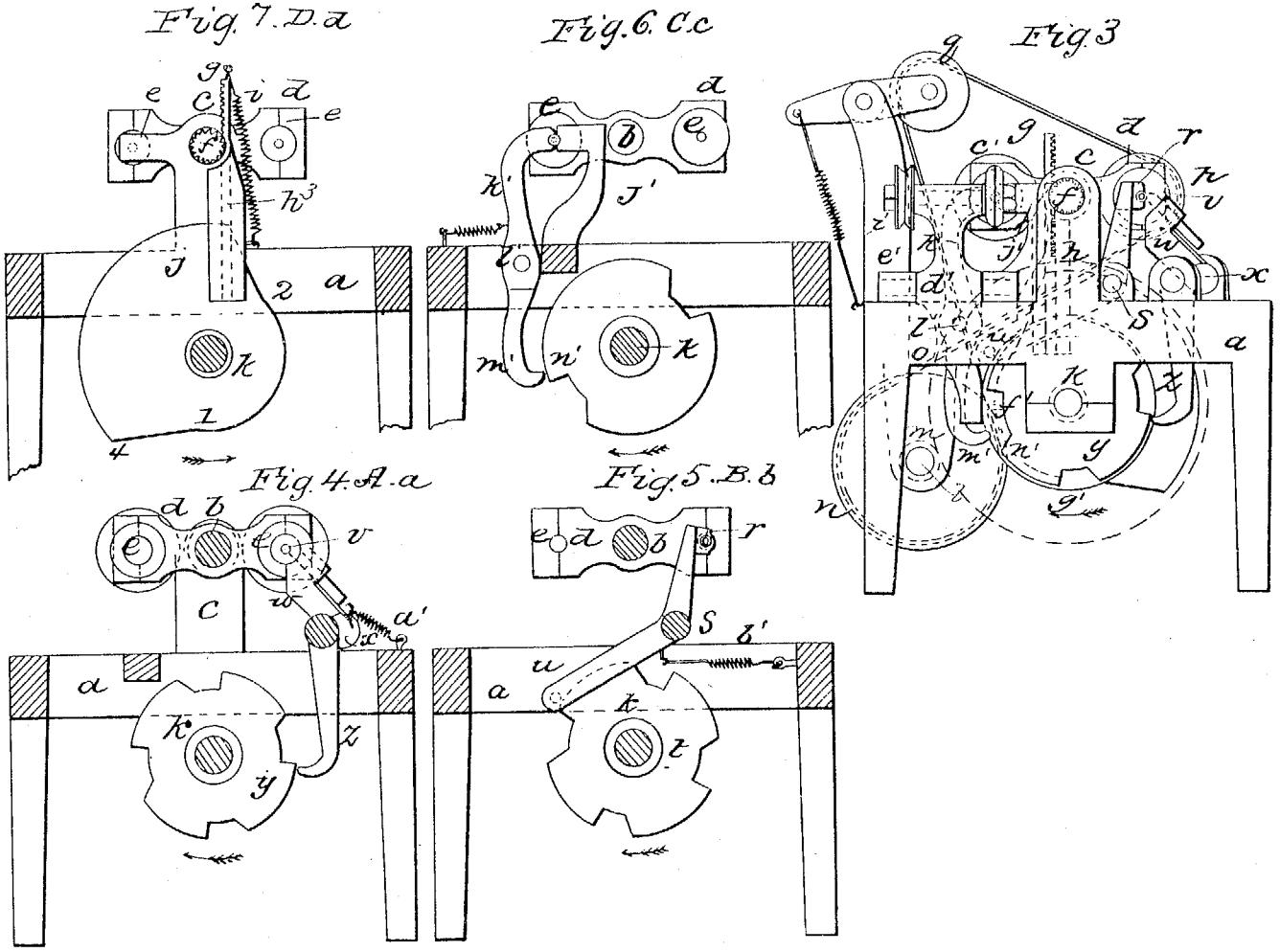
N. PETERS, Photo-Lithographer, Washington, D. C.

UNITED STATES PATENT OFFICE.

THOMAS J. SLOAN, OF PROVIDENCE, RHODE ISLAND, ASSIGNOR TO THE AMERICAN SCREW COMPANY.

IMPROVEMENT IN MACHINES FOR SHAVING AND NICKING SCREWS.

Specification forming part of Letters Patent No. 8,456, dated October 21, 1851; extended seven years; Reissue No. 2,182, dated March 6, 1866.

*To all whom it may concern:*

Be it known that I, THOMAS J. SLOAN, of the city, county, and State of New York, have invented certain new and useful Improvements in Machinery for Shaving, Nicking, and Reshaving the Heads of Wood-Screws; and I do hereby declare that the following is a full, clear, and exact description thereof, reference being had to the accompanying drawings, making part of this specification, in which—

Figure 1 is a plan; Fig. 2, a front elevation; Fig. 3, an end elevation; Figs. 4, 5, 6, and 7, cross-vertical sections taken at the lines A *a*, B *b*, C *c*, and D *d* of Fig. 1, and looking in the direction of the arrows; and Fig. 8, a developed view of cam *g'*.

The same letters indicate like parts in all the figures.

Prior to my said invention it was the practice in the manufacture of wood-screws in some instances to grip the blank by the shank between two disks, which were made to rotate in the direction of their planes, to carry it first to a rotating burr-cutter to cut the nick, and then to a pair of cutters on a rotating spindle, which cutters were caused gradually to approach to shave the head; and in other instances the shank of the screw-blank was gripped by a pair of jaws on a rotating mandrel, and the head shaved by a cutter on a movable tool-post, to turn the head as in a lathe, and then the nick was cut in a separate machine; and in some instances attempts were made in a third machine to reshave the head after the nick was cut, to remove the burr formed on the upper and under surface of the head by the operation of cutting the nick.

All the said methods were defective, because burrs were left on the upper and under surface of the head by the operation of cutting the nick, and when attempts were made to avoid this by cutting the nick before shaving the head, the cutter in passing the nick would produce a chattering or tremulous motion, and would break off the corners and leave burrs in the nick. And the attemps to remove the burrs from the upper and under surfaces of the head when the nicking was done after the shaving operation utterly failed, because it was found impracticable to insert the blanks which had been shaved and nicked in another machine with such accuracy as to bear the same relation to the cutter that they did in the machine in which the heads were first shaved, and unless they could be so inserted the cutter would spoil the heads.

All the above defects were overcome by my said invention, the mode of operation of which is such that the three operations of shaving the head, cutting the nick, and reshaving to remove the burrs are all performed in succession while the blank is held in the same pair of jaws. It results from this that the head of the blank can be readily made to bear the same relation to the cutters that operate upon it in succession. By so organizing the machine, the shank of the blank is gripped in a pair of jaws on a rotating mandrel, and rotated as in a lathe, and by combining therewith a rest to bear against the shank to steady it, and a chasing-tool on a tool-stock, which gradually approaches the head to shave it, and also a rotating cutter to cut the nick, the operation of shaving the head is performed as perfectly as if turned in a lathe—a result which cannot be attained when the cutters for shaving the head are on a rotating mandrel while at the same time, by the use of a rest, the blank, though held in the jaws of a mandrel, which must rotate freely during the shaving operation, is held firmly (when the mandrel is stopped) during the operation of nicking, and I am enabled to perform in succession the operation of shaving, nicking, and reshaving by subjecting the blank to the three successive operations while it is held in the same jaws, although for the purpose of greater expedition I use what constitutes a part of my said invention—two pairs of jaws on two mandrels connected with and on opposite sides of a rock-shaft, and having the mechanism for shaving the heads on one side, and the mechanism for nicking on the opposite side, so that while the head of one blank is being shaved another which has been shaved is being nicked, and after being nicked it is shifted back to the shaving mechanism to be reshaved to remove the burrs, if desired.

In the said drawings, *a* represents the frame, and *b* a shaft mounted in appropriate boxes *c c*. On this shaft there are two sets of arms, Bolt, Nail, Nut, Rivet, & Screw Making,
Screw Making, Head Nicking & Shaving.

*d d*, on opposite sides, each set carrying a mandrel, *e*, and each mandrel to be provided with gripping-jaws—such as are usually employed in machinery for making wood-screws, but which it is not necessary to describe and represent, as they are well known to persons acquainted with machinery for making wood-screws. The shaft *b* carries on its rear end a pinion, *f*, the cogs of which engage a rack, *g*, that slides in a part, *h*, of the frame. This rack is drawn down by a spring, *i*, and its lower end rests on the periphery of a cam, *j*, on the cam-shaft *k*. The form of this cam is such that from the point 1 to 2 it is concentric to keep the rack in its lowest position, that the two mandrels may be in the same horizontal plane; from 2 to 3 it gradually runs out to force up the rack to turn the shaft so as to reverse the position of the mandrels, and from 3 to 4 the cam is concentric to retain the rack and shaft in this position, and from 4 to 1 the cam runs in toward the shaft to reshift the mandrels.

The cam-shaft receives motion from the driving-shaft *l* by a pinion and cog-wheel, *m m*, and on the driving-shaft there is a band-wheel, *n*, that drives the mandrels *e e* one after the other—that is to say, it drives the mandrel that is in line for presenting the blank to be shaved. To accomplish this, a band, *o*, passes from the band-wheel *n* around a pulley, *p*, on the mandrel that is in position to shave the head of the blank, thence the band passes around a tightening-pulley, *q*, and back to the wheel *n*. In this way it will be seen that although the pulleys on the two mandrels are within the course of the band, the one that is in the position to present a blank to be shaved will be rotated, while the other, which is in a position to present the blank to be nicked will not be acted upon by the band, but will remain stationary for the time being. On the shaving side a blank is inserted and gripped in the jaws in the usual way, and then a rest, *r*, on a rock-shaft, *s*, is forced up against the shank of the blank by a cam, *t*, on the cam-shaft, that acts on the arm *u* of the rocker, and as the rest supports the blank the cutter or shaver *v*, on the cutter-stock *w*, mounted on a rocker, *x*, is carried up to the head of the blank by the action of a cam, *y*, that acts on an arm, *z*, of the rocker *x*. So soon as the head has been properly shaved, the cutter and rest are drawn back by the tension of springs *a'* and *b'*, the cams being properly formed to permit this, and so soon as this has taken place the cam *j* acts on and forces up the rack to shift the mandrels, by which the blank which has been shaved is presented on the other side to a nicking-saw, *c'*, on an appropriate arbor mounted in the upper end of a lever, *d'*, that turns on a fulcrum at *e'*, the lower arm of the said lever being provided with a wrist-pin, *f'*, which is kept in contact with the face of the cam *g'* (represented as developed at Fig. 8) by the tension of a spring, *h'*. The form of the cam is such as to carry the nicking-saw toward the head of the blank to cut the nick and then back when the nick is completed. The arbor of the saw is provided with a pulley, *i'*, by which it is driven by some first mover.

During the operation of the nicking-saw the shank of the blank is held firmly by a permanent rest, *j'*, on one side, and a movable rest, *k'*, on the other. This movable rest is on a rocker, *l'*, provided with an arm, *m'*, acted upon by a cam, *n'*, on the cam-shaft. While the nicking operation on this blank is going on, a blank previously nicked is presented to the action of the shaver, and the rest and shaving-cutter are again carried up to remove the burrs, but no more. The rest and cutter then move back, the blank is discharged, and a fresh blank put in to receive the first shaving operation, and when this is completed the mandrels are reversed, the nicked blank presented to the cutter for the second shaving operation, and the one that has received the first shaving operation is presented to be nicked.

It will be seen that the cams that give the motions to the rest and the shaving-cutter for the shaving operations are made to act on the parts to be operated twice to once of the cams which operate the movable rest and nicking-saw for the nicking operation, for the reason that the two shaving operations are performed—that is, the last shaving on one blank and the first shaving on another—while a blank is being nicked.

During the nicking operation it is important that the under surface of the head of the blank be pressed or held firmly against the rests, to prevent the jar occasioned by the action of the saw from straining the grip of the jaws on the blank and producing a tremulous motion, in view of the fact that the mandrel must be sufficiently free to turn during the shaving operations; but it is difficult so to mount the mandrels in their boxes that during the operations of the machine the mandrel will always bear the same relations to the rest, and in the shaving operations it is of the utmost importance that the mandrels bear at all times the same relations to the cutter. To meet these contingencies I make the mandrels with a slight end-play in their boxes, so that when the saw is brought against the head of a blank the mandrel shall yield endwise until the bevel of the head of the blank is brought up against the rests and there held by them; and for the shaving operation the rear end of the mandrels, as each in succession is brought into line, passes by a permanent rest, *o'*, beveled from the top and bottom so as to insure the proper position of the mandrels relatively to the cutter, and for the purpose of more accurate adjustment I insert a set-screw, *p'*, in the rear end of each mandrel, the head of which acts against the rest *o'*.

Having thus described the principle or character of my invention, and the manner of constructing and using the same, I wish it to be distinctly understood that I do not limit myself to the precise construction and arrangement of the parts, as these may be variously modified without affecting the principle or mode of operation which I have invented and claim to be new.

What I claim as my invention, and desire to secure by Letters Patent, is—

1. The combination of the gripping-jaws on the rotating mandrel, the shaving-tool on the movable tool-post, and the cutter for cutting the nick in the head, substantially as described, to perform the operations of shaving and nicking in succession and while the blank is gripped in the same jaws.

2. The two mandrels with their gripping-jaws, in combination with the shaving mechanism and the nicking mechanism, substantially as described, so that the operation of shaving can be performed on one blank while the operation of nicking is being performed on another blank, as set forth.

3. Giving to the mandrel or mandrels end-play in their boxes, in combination with the permanent rest at the back of the mandrel and with the cutter, substantially as specified, by means of which the same position of the blank relatively to the cutter is obtained for the second shaving operation which it had for the first, as described.

4. The combination of the gripping-jaws on the rotating mandrel, the shaving-tool on the movable tool-post, the rest for bearing against the blank to steady it while being acted upon, and the cutter for cutting the nick, substantially as and for the purpose described.

5. The combination of the gripping-jaws on the mandrel for holding the screw-blank, the cutter for cutting the nick, and the rest for holding the blank steady while it is being nicked, substantially as described, whereby I am enabled to nick the head while the blank is held in the jaws of a mandrel capable of being rotated.

6. Subjecting the blank, while held in the same jaws, successively to the three operations of shaving, nicking, and reshaving, by the means substantially as herein described.

THOS. J. SLOAN.

Witnesses:

W. H. BISHOP,

ANDREW DE LACY.